(12) United States Patent
Fraden

(10) Patent No.: US 7,490,512 B2
(45) Date of Patent: Feb. 17, 2009

(54) DETECTOR OF LOW LEVELS OF GAS PRESSURE AND FLOW

(76) Inventor: Jacob Fraden, 5260 Renaissance Ave., San Diego, CA (US) 92122

(*) Notice: Subject to any disclaimer, the term of this patent is extended or adjusted under 35 U.S.C. 154(b) by 0 days.

(21) Appl. No.: 11/897,340

(22) Filed: Aug. 31, 2007

(65) Prior Publication Data
US 2008/0053196 A1 Mar. 6, 2008

Related U.S. Application Data

(60) Provisional application No. 60/841,663, filed on Sep. 1, 2006.

(51) Int. Cl.
*G01F 1/68* (2006.01)
(52) U.S. Cl. .................. 73/204.26; 73/861.66
(58) Field of Classification Search .......... 73/700, 73/204.26, 204.15, 861.66, 861.42
See application file for complete search history.

(56) References Cited

U.S. PATENT DOCUMENTS

| | | | | |
|---|---|---|---|---|
| 3,981,193 A | * | 9/1976 | Goulet .................. | 73/861.66 |
| 4,453,419 A | * | 6/1984 | Engelke ................ | 73/861.66 |
| 4,686,856 A | * | 8/1987 | Vavra et al. .......... | 73/204.15 |
| 5,123,288 A | * | 6/1992 | Tench et al. .......... | 73/861.66 |
| 5,481,925 A | * | 1/1996 | Woodbury ............ | 73/861.66 |
| 6,237,426 B1 | * | 5/2001 | Gryc et al. ........... | 73/861.66 |
| 6,776,817 B2 | * | 8/2004 | Lentz et al. .......... | 73/204.26 |
| 6,928,884 B1 | * | 8/2005 | Pearson ................ | 73/861.42 |
| 6,999,882 B2 | * | 2/2006 | Frie et al. ................ | 702/50 |
| 2003/0097875 A1 | * | 5/2003 | Lentz et al. .......... | 73/204.26 |
| 2006/0230825 A1 | * | 10/2006 | Gryc et al. ........... | 73/204.22 |

* cited by examiner

Primary Examiner—Andre J Allen

(57) ABSTRACT

A detector for monitoring the low levels of differential pressures and the rate of mass flow rate of gas (air, e.g.) in a duct. The sensor's temperature is maintained at a constant gradient above temperature of the flowing gas, typically 4-7° C. higher. The detector consists of two thermally decoupled sensors—one is the air temperature sensor and the other is a temperature sensor coupled to a heater. The sensors are connected to an electronic servo circuit that controls electric power supplied to the heater. The sensors are positioned outside of the air duct and coupled to the duct via a relatively thin sensing tube protruding inside the duct. The end of the tube has an opening facing downstream of the gas flow, thus being exposed to a static gas pressure. The detector can be employed in fuel burners of the HVAC systems, internal combustion engines, medical equipment to control flow of anesthetic gases, in the security systems to monitor minute changes in air pressure resulted from opening and closing of doors and windows in a protected facility.

13 Claims, 8 Drawing Sheets

DETECTOR OF LOW LEVELS OF GAS PRESSURE AND FLOW

The present invention relates generally to devices for measuring and monitoring differential gas pressure and relatively low rates of gas flow. It is based on U.S. Provisional Patent Application No. 60/841,663 filed on Sep. 1, 2006.

BACKGROUND OF INVENTION

In many types of equipment that use movements of air or other gases, measuring the mass flow rate of the gas and/or static gas pressure is very important. An example is a HVAC system of a residential dwelling that incorporates an air filter. Typically, mass of gas (air, in particular) is driven through the dwelling or machinery by means of a forced convection. The purpose of the air filters is to remove airborne contaminants that may adversely effect health of humans and animals, cause malfunction or reduction in efficiency of equipment, and deposits of soiling compounds onto various surfaces. A typical HVAC system is shown in FIG. 1 where the house 1 has generally atmospheric pressure $P_2$ due to exposure to atmosphere through doors and windows 80. The HVAC system is comprised of the blower 5, air conditioner/burner 6, and air filter 7. The blower 5 moves air. The air flow 2 is indicated by arrows. The static negative air pressures (as compared to the atmosphere) are formed across the air filter 7, adjacent to it sides 8 and 9. These pressures cause the air flow 2 through the filter and through the air duct 4 connected to the house. The negative air pressures at sides 8 and 9 are shown in FIG. 2 and the air flow rate is shown in FIG. 3 as function of the air filter 7 clogging, in percents, where a 100% clogging is a total filter blockage. It is clear from FIGS. 2 and 3 that the filter contamination can be detected either from monitoring the air flow rate or from one or both static air pressures across the filter 7. To detect the air filter clogging in a HVAC system, the monitor 10 with a sensor 11 can be installed into an air duct either upstream or downstream from the air filter 7. Note that the sensor 11 can be either a flow sensor or pressure sensor.

In the automotive applications and various types of fuel burners, providing a right fuel-to-air ratio is critical for the device efficiency and reduction of pollution. In these devices monitoring either a pressure at the blower or air flow can be very beneficial.

In medical equipment used for anesthesiology, gases should be efficiently mixed for safety and correct medical effect. A flow monitoring is an important part of the gas delivery control system.

In security systems, one method of detecting an intrusion into a protected area is monitoring variations in air pressure that may result from closing and opening of doors and window. All the above requires monitoring of very low changes in air pressure and inexpensive and safe monitoring of the air mass flow rate.

In this patent, we use word "air", although it should be understood that any gas or mixture of gases can be monitored in a similar manner.

DESCRIPTION OF PRIOR ART

There are two ways of determining the air flow velocity: indirect and direct. In the indirect way, the air flow rate is computed from a differential pressure. Historically, was determined by a calculation that used two values of pressures: the total pressure in a flow and the static pressure. Originally, this method employed the Pitot tubes where the first tube (total pressure) has an opening facing upstream and the other tube (static pressure) had one ore more openings either facing downstream or normal to the flow. Pressures at the Pitot tube outputs could be measured by many types of the pressure sensors, ranging from the water manometers to the solid-state sensors fabricated by the MEMS technologies.

Air flow always depends on the pressure difference across the tube of flow. When the air flow velocity is computed from a pressure differential $P_{1\text{-}2}$, the following equation may be employed:

$$v_{1-2} = \sqrt{2g \frac{P_{1-2}}{kd}}, \tag{1}$$

where g is the acceleration of gravity, k is the flow resistance coefficient, and d is the air density.

A determination of the differential air pressure can be done by placing two static pressure transducers across the air flow restriction, such as the air filter 7 as in FIG. 1. One problem in using the indirect method is a difficulty in monitoring very low air flow rates which may be as low as few mm of $H_2O$. This requires very sensitive pressure detectors that in many cases may be too complex or too expensive or not sufficiently accurate.

In a direct way of the air flow measurement, a special air flow sensor (detector) is used. Its output signal is caused by the moving air molecules, rather than by the air pressure differential in the flow. A popular type of a direct sensor is a hot wire anemometer where a wire is heated to high temperatures, 50° C. or higher above the air temperature. The air velocity is measured from the heat loss due a cooling effect by a moving air. A hot wire anemometer is based on the principle of thermo-anemometry. A general principle of thermo-anemometry is well known in industry for measuring flow of fluids. The basic theory of it is described in book: *Jacob Fraden. Handbook of Modern Sensors*. Springer Verlag. $3^{rd}$ ed., pp. 359-380. A U.S. Pat. No. 6,543,282 issued to Thompson is an example of a flow sensor based on the thermo-anemometry principle. A low temperature heater of a thermal anemometer is described in U.S. Pat. No. 7,178,410 issued to Fraden et al.

Another method of gas flow measurement is based on the ultrasonic and electromagnetic techniques. And another method employs a mechanical rotating vane anemometer. The direct methods of air flow monitoring generally may be very sensitive and sufficiently accurate to monitor low flow rates. On the other hand, the direct sensors may require a direct placement into the flow duct that may increase cost and make maintenance more difficult.

It is therefore the goal of this invention to provide a sensing device for continuous monitoring of gas mass flow rate;

It is another goal of this invention to provide a sensor that is capable of monitoring low levels of a differential air pressure;

And another goal of the invention is to provide an air flow sensor that can operate over a broad range of temperatures;

It is also a goal of this invention to provide an air flow sensor that is simple and inexpensive;

A further goal of this invention to provide a security indicator responsive to small changes in the air pressure;

And another goal is to provide a method of monitoring of air flow in an air intake for the fuel burners and combustive engines.

SUMMARY OF INVENTION

The invention is based on a combination of the principle of a thermo anemometry and the classical Pitot tubes arrangement. The air flow detector is comprised of a sensing tube having an opening and two sensors where one is the air temperature sensor and the other is a similar temperature sensor being thermally coupled to a heater, whereas both sensors and the heater and connected to an electronic servo control loop. The servo circuit output represents both the air mass flow rate and the differential air pressure between the sensing tube opening and the opposite side of the flow detector.

DESCRIPTION OF PREFERRED EMBODIMENTS

Figure 1:
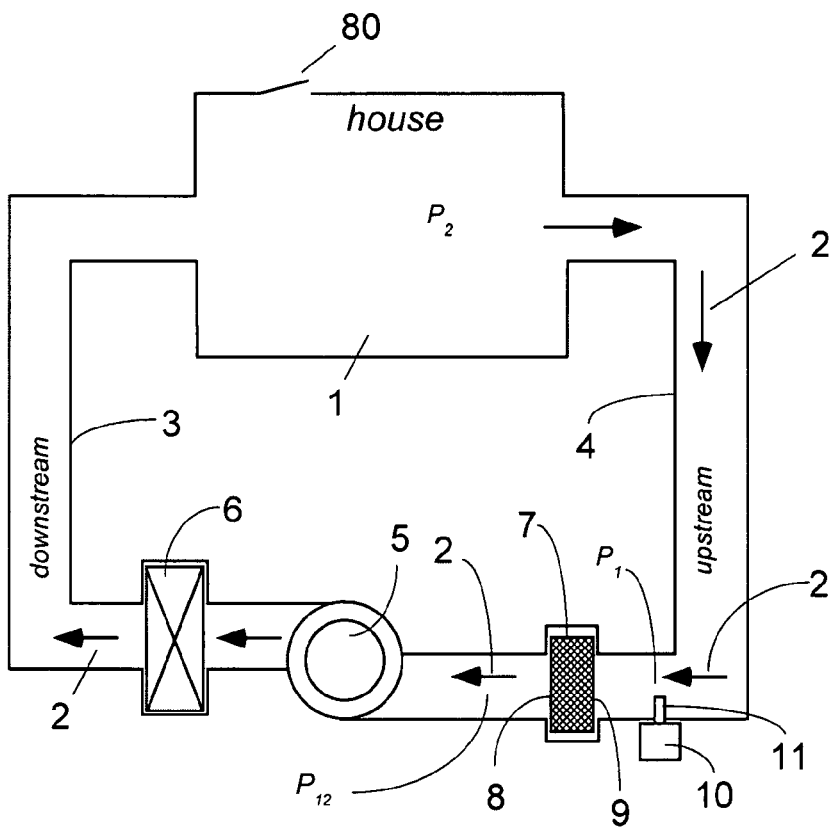
FIG. 1 is a schematic diagram of a dwelling with the HVAC system.
Figure 2:
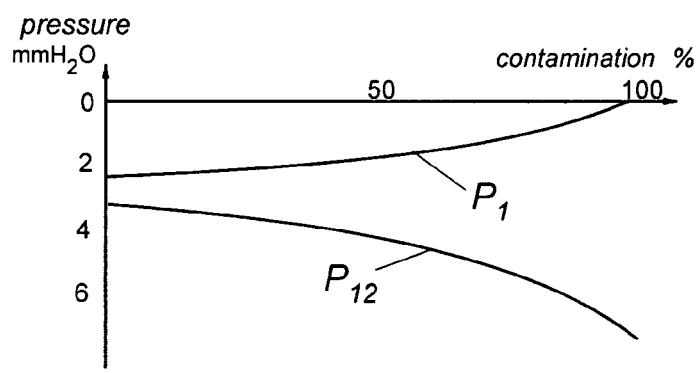
FIG. 2 is the graphs of pressures at air filter sides as function of its clogging.
Figure 3:
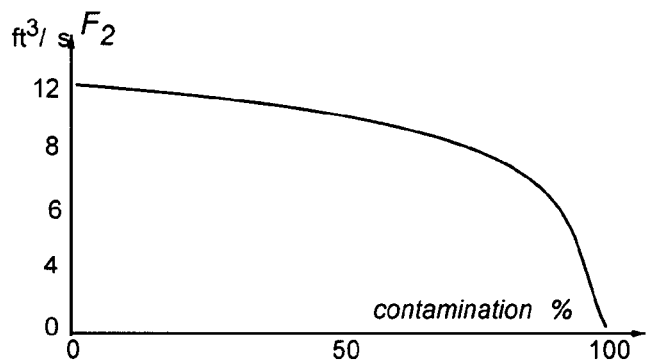
FIG. 3 is a graph showing dependence of the air flow rate as a function of the air filter clogging.
Figure 4:
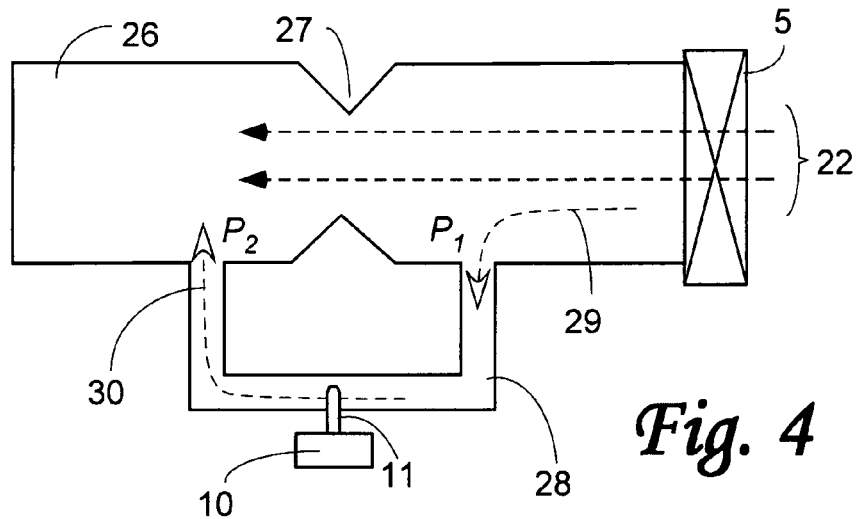
FIG. 4 show an air ducts with a bypass tube with the air flow sensor.

As it follows from Eq. (1), a differential air pressure can be computed from the air flow rate from the following formula:

$$P_{1-2} = v_{1-2}^2 \frac{kd}{2g}, \quad (2)$$

and therefore, a differential pressure measurement may be substituted by measurement of the air flow as shown in a general diagram of FIG. 4. The air duct 26 contains an air flow restriction 27 that can be caused, for example, by an air duct geometry, the air filter, or other components. The air flow 22 is produced by the air blower 5. A bypass tube 28 circumvents the flow restriction 27, thus diverting a small portion of air flow 29 to go through the bypass tube 28 and exit as flow 30 at the other side of restriction 27. The respective ends of the bypass tube 28 are exposed to two air pressures, $P_1$ and $P_2$. An air flow monitor 10 is installed at the bypass tube 28 with its flow sensor 11 being exposed to the interior of the bypass tube 28. Since the airflow 30 inside the bypass tube 28 related to a differential pressure $P_{1-2}=P_1-P_2$, this pressure can be computed with the use of Eq. (2).

Figure 7:
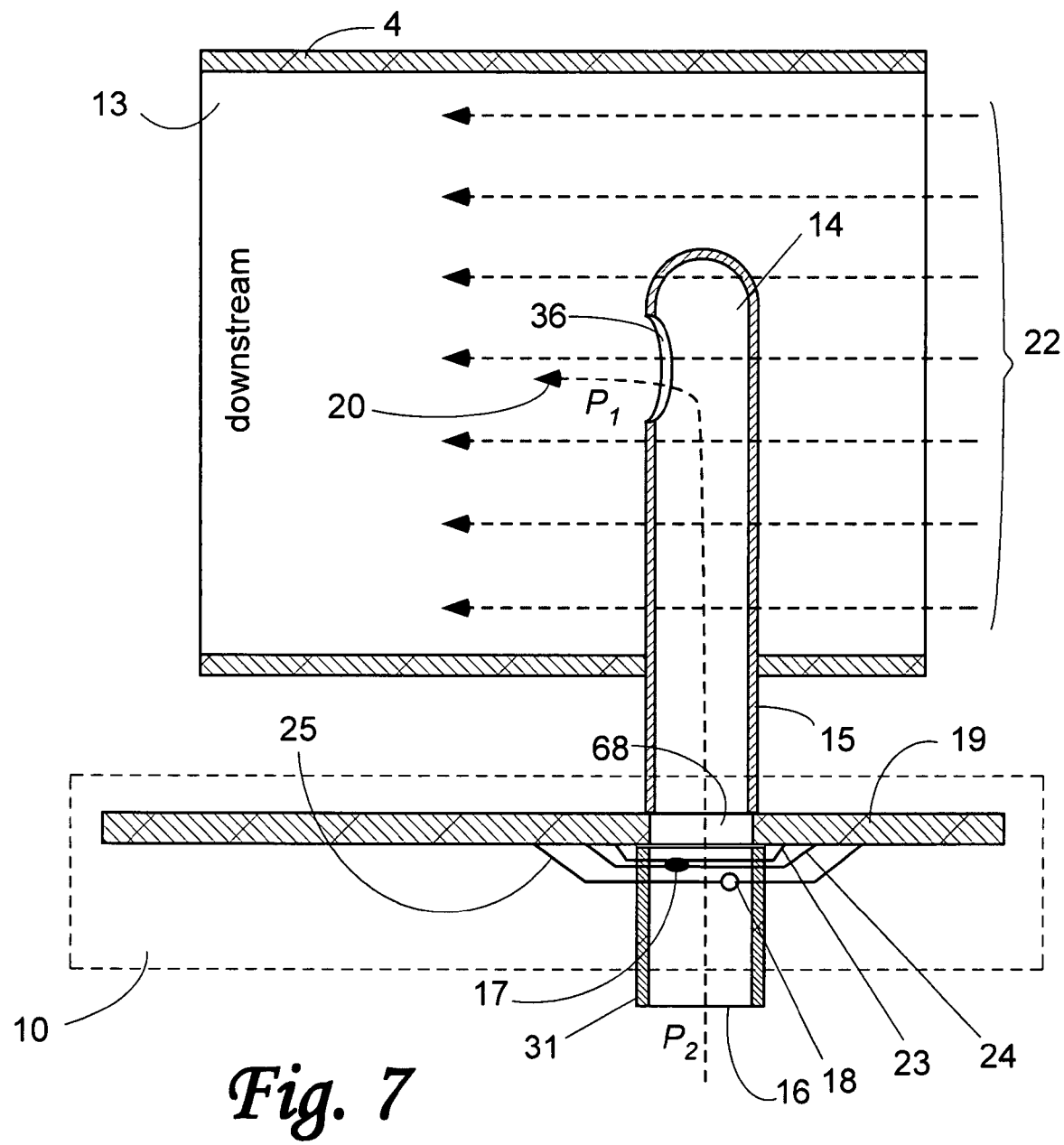
FIG. 7 shows a flow/pressure sensor with the sensing tube inside the air duct.

While FIG. 4 illustrates a general operating principle of the present invention, the practical implementations can take various forms. A preferred embodiment of the monitor 10 with a flow sensor is depicted in FIG. 7. The air duct 4 conducts air flow 22. At a particular spot of its inner cross-section, a static air pressure $P_1$ exists (with respect to the external pressure). The sensing tube 15 is inserted into the air duct 4 to be positioned near a spot of the interest (the one with pressure $P_1$). The tube has an opening 36 facing downstream from the flow 22. At the other side of the sensing tube 15, there is an inlet tube 31 with the opening 16 exposed to external pressure $P_2$ that may be the atmospheric pressure. In-between the sensing tube 15 and the inlet tube 31, there are two sensors: the reference temperature sensor 18 supported by wires 25 and the TA sensor 17 that is supported by wires 23 and 24 (TA stands for "thermo-anemometer"). Both sensors are mounted on a printed circuit board 19 that has an opening 68 to allow air flow 20 to pass by the sensors 17 and 18. Note that this arrangement responds to an absolute pressure differential and absolute value of air flow (regardless of the direction of the air flow 22). This means that the air flow 20 may go in either direction inside the interior 14 of the sensing tube 15, depending whether $P_{1-2}$ is positive or negative. It is important that sensors 17 and 18 are thermally decoupled from one another.

Figures 5, 6:
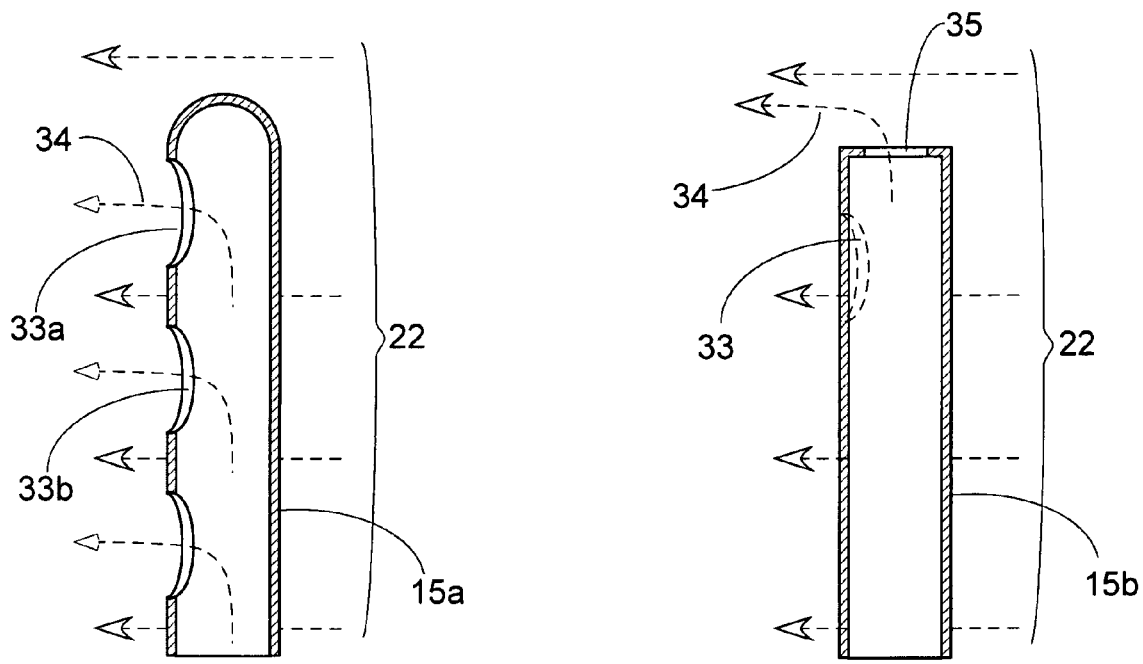
FIG. 5 shows a sensing tube with multiple openings facing downstream.
FIG. 6 shows a sensing tube with an opening normal to the flow direction.

The sensing tube 15 may have various types of openings. If the opening faces downstream, the measured pressure will be static. If it faces upstream, the measured pressure will be static plus dynamic. FIG. 5 shows the multiple openings 33a, 33b, etc. which allow exposing the tube's 15a interior to different points of the air flow 22 and thus to different static air pressures. The integral air flow through the sensing tube 15a will be the function of all these pressures. Another practical type of an opening is depicted in FIG. 6, where at least one opening 35 is made at the end of the sensing tube 15b. This opening(s) 35 is normal to the air flow 22 and thus is exposed to the static pressure. Note that optionally an additional side opening 33 may be combined with the end opening(s) 35.

Figure 8:
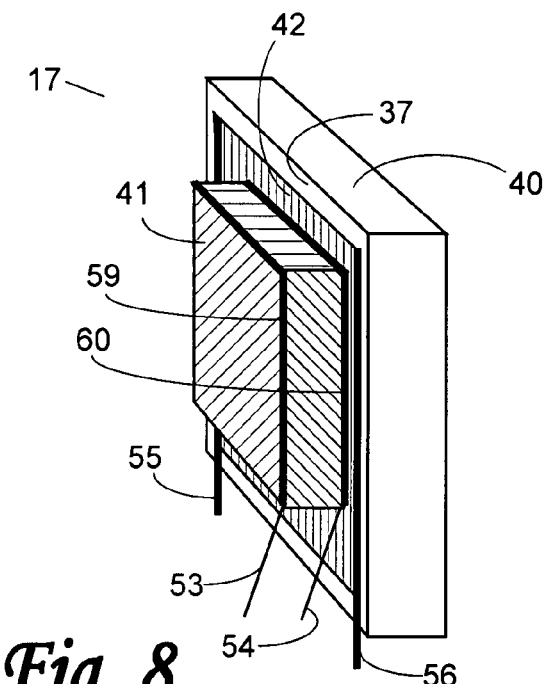
FIG. 8 represents a thermo-anemometer sensor with a thermistor.
Figure 9:
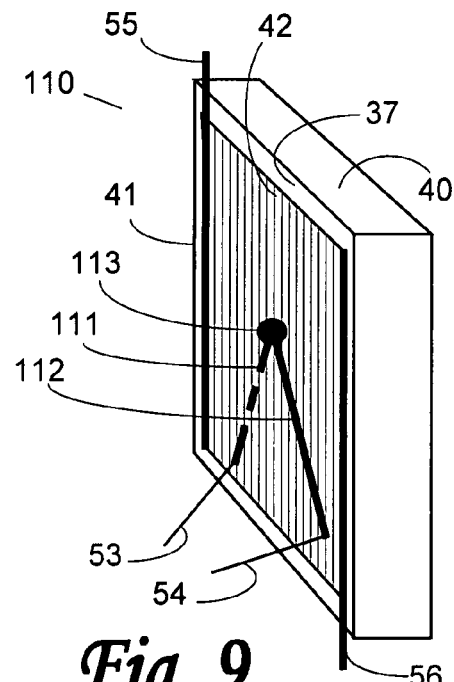
FIG. 9 is a thermo-anemometer sensor with a thermo-couple

FIG. 8 depicts the TA sensor 17 built on a substrate 40 which can be a ceramic, plastic or metal. If metal, the substrate 40 should have electrically isolated front surface 37. On the front surface 37, a resistive layer (heater 42) is deposited. It has a typical resistance between 10 and 100 Ohms. The heater 42 is connected to terminals 55 and 56. The heater 42 temperature can be elevated by passing electric current through terminals 55 and 56. A temperature sensor 41 is attached and thermally coupled to the heater 42 so that temperature of the heater may be measured. As the temperature sensor 41, various types of temperature sensors can be employed. One example is an NTC thermistor with the top-bottom electrodes 59 and 60 attached to the conductors 53 and 54. Since the TA sensor 17 is exposed to the air flow, for a better protection from the airborne contaminants, it may be enveloped by a protective coating (not shown), such as glass, epoxy, etc. Thermal conductivity of such a layer should be as high as practical. FIG. 9 illustrates another design of a temperature sensor with a thermo-couple joint 113 of two dissimilar wires 111 and 112.

A reference sensor 18 is a small conventional temperature sensor fabricated, for example, in a bead shape and is not depicted here. It shall be positioned in the same air flow as the TA sensor 17 but must be thermally decoupled from the TA sensor 17. The location of both sensors in the air flow 20 is illustrated in FIG. 7.

Figure 10:
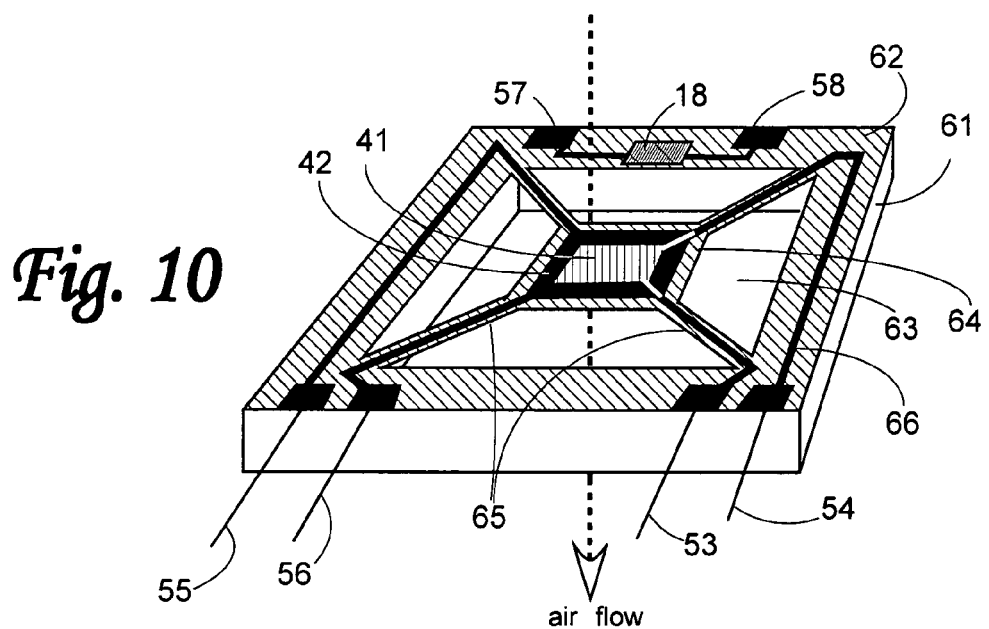
FIG. 10 depicts a thermo-anemometer sensor fabricated with the MEMS technology.

An air flow detector design which is a combination of a reference sensor 18 and the TA sensor 17 fabricated with the MEMS technology is shown in FIG. 10. The combined sensor is fabricated as a silicon frame 61 with opening 63 where air flow can pass though. All electrical parts are formed and deposited on the front surface 62. A thin membrane 64 is etched in the center of the opening 63 and is supported by the silicon links 65. A thickness of the membrane 64 may me on the range of 1 micrometer. A resistive heater 42 is formed on the membrane 64 while the temperature sensor 41 is also located on the same membrane 64. The heater 42 and temperature sensor 41 may be either on top of one another or inter-digitized side by side. It is important that they are thermally coupled. The reference temperature sensor 18 is positioned on the frame 61 and exposed to the same air flow. The sensor 18 is connected to the terminal pads 57 and 58. The temperature sensors 18 and 41 can be resistive, semiconductive or thermoelectric. The resistive heater 42 is connected to terminals 55 and 56 while the second temperature sensor 41 is connected to conductors 53 and 54 via the conductive paths 66. The combined sensor of FIG. 9 can be positioned at the opening 68 (FIG. 7) in place of the discrete sensors 17 and 18. An alternative design of the MEMS sensor is without the opening 63 where the air flow hoe parallel to membrane 64 which is directly supported by the frame 61.

Figure 11:
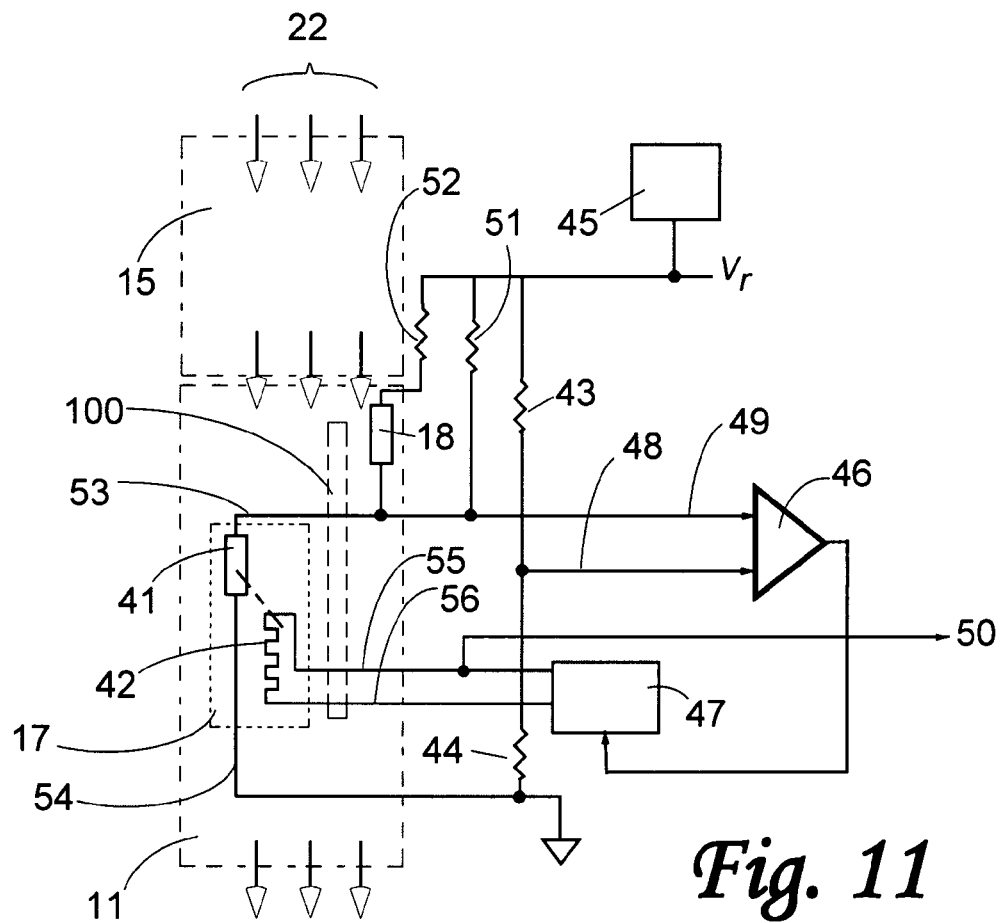
FIG. 11 is circuit diagram of a servo loop for the air flow sensor with thermistor sensors.
Figure 12:
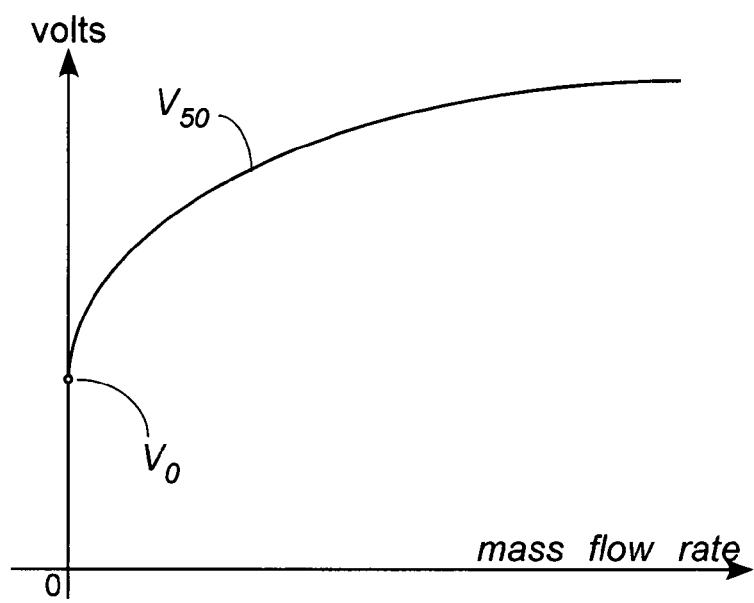
FIG. 12 shows a graph of the servo circuit output voltage as function of mass flow rate.

FIG. 11 shows a servo circuit diagram where the temperature sensors are the NTC thermistors. The TA sensor 17 consists of thermally coupled thermistor temperature sensor 41 and heater 42. Along with the reference temperature sensor 18 they are exposed to air flow 22 passing through the sensing tube 15. A thermal insulator 100 is positioned between the sensors 17 and 18. A thermal insulator may be an air gap between the sensors as illustrated in FIGS. 7 and 10. The reference temperature sensor 18 measures the air temperature while the TA sensor measures the heat loss resulted from the air flow. These two sensors 18 and 17 along with two resistors 43 and 44 form a Wheatstone bridge circuit having the outputs 48 and 49 connected to the servo amplifier 46. Two additional resistors 51 and 52 can be connected to the reference temperature sensor 18 for improving its operation over a broader range of the air temperatures. The ratio of the resistors 43 and 44 is such as to correspond to the second temperature sensor 41 be warmer than the reference temperature sensor 18 by a constant thermal gradient of several degree C., typically, 4-7° C.

$$\frac{R_a}{R_g} = \frac{R_{43}}{R_{44}}, \quad (3)$$

where $R_a$ is the combined resistance of the reference temperature sensor 18 at the air temperature $T_a$, and the resistors 52 and 51, $R_g$ is the resistance of the temperature sensor (inside the TA sensor 17) when its temperature $T_g = T_a + g$, $R_{43}$ and $R_{44}$ are the resistances of the resistors 43 and 44 respectively, and g is the constant temperature gradient.

The output of the servo amplifier 46 drives the current amplifier 47 that is capable of pushing a sufficient electric current through the heater 42. The purpose of the servo circuit is to balance the Whetstone bridge by elevating temperature of the heater 42 and, subsequently, of the second temperature sensor 41. When air flow 22 cools down the TA sensor 17, more current is required through heater 42 to maintain the constant temperature gradient above ambient temperature that is measured by the reference temperature sensor 18. The servo amplifier 46 may be substituted with a micro-controller having a software that provides a PID function to control the heater 42. The voltage 50 across the heater 42 is the output of the measurement circuit that represents the magnitude of the mass flow rate through the test tube 15. FIG. 11 illustrates dependence of the output voltage 50 from the air mass flow rate. Note that at zero flow rate, the output has a bias of $V_0$.

Figure 15:
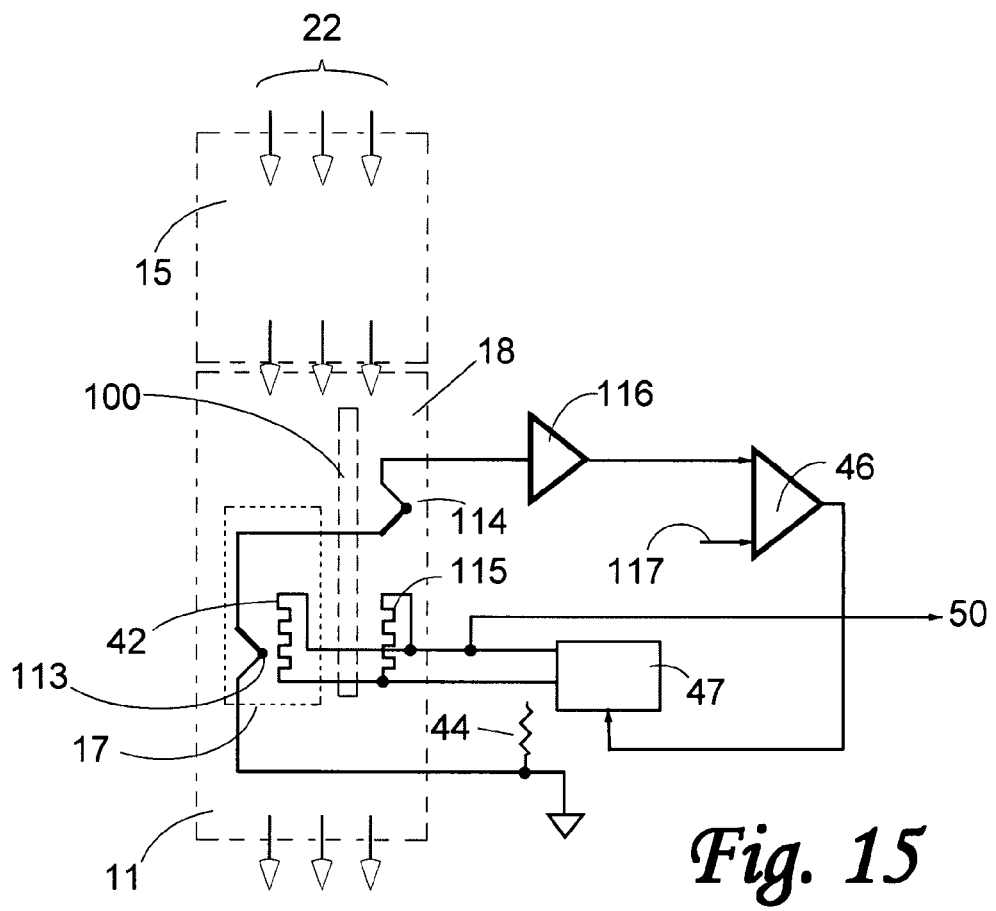
FIG. 15 shows is circuit diagram of a servo loop for the air flow sensor with thermo-couples.
Figure 16:
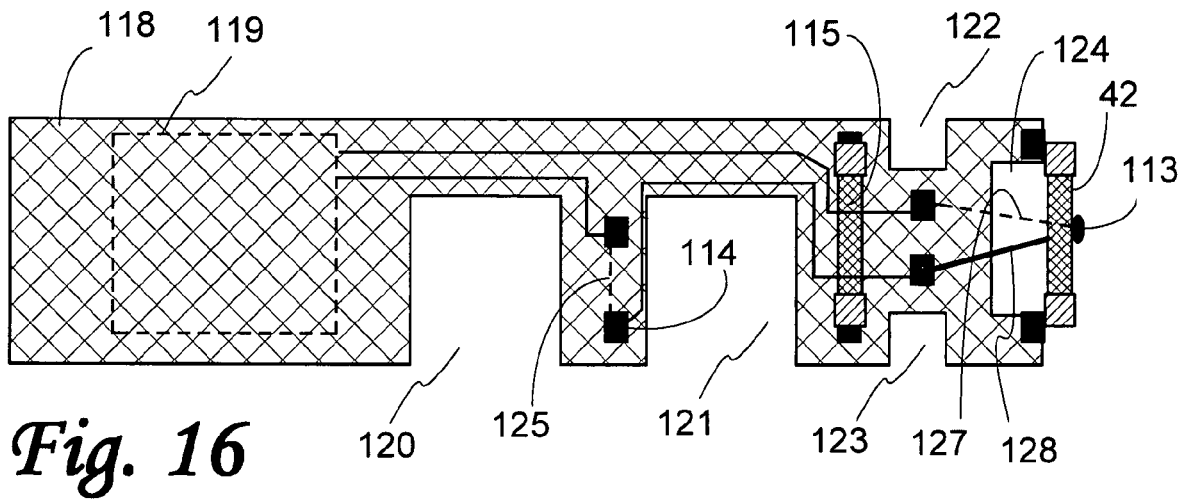
FIG. 16 is an illustration of a flow-sensor assembled on a circuit board.

Another embodiment of the flow sensor can use thermocouples as temperature sensors. This is illustrated by the servo-circuit of FIG. 15 where a "hot" thermo-couple 113 is connected in series with a "cold" thermocouple 114 and, in turn, to a pre-amplifier 115. A reference signal 117 is applied to the servo amplifier 46. The rest of the circuit operates similarly to the circuit of FIG. 11. The "cold" thermocouple 114 measures the air temperature. Note that an additional heating element 115 may be added. It's function is to compensate for the conductive heat losses from heater 113 via the supporting structure. This idea is further illustrated in FIG. 16 which shows an air flow sensor fabricated on a miniature circuit board 118. The board may also carry an electronic circuit 119. Note that different parts of the circuit board 118 has cut-outs 120-124 to reduce a conductive heat flow from the sensing heater 42 toward the reference ("cold") thermocouple junction 125. The thermocouple wires 127 and 128 pass under the additional heating element 115 before forming a "cold" junction 114. The heating element conductors are not shown in FIG. 16.

Security System Applications

Figure 13:
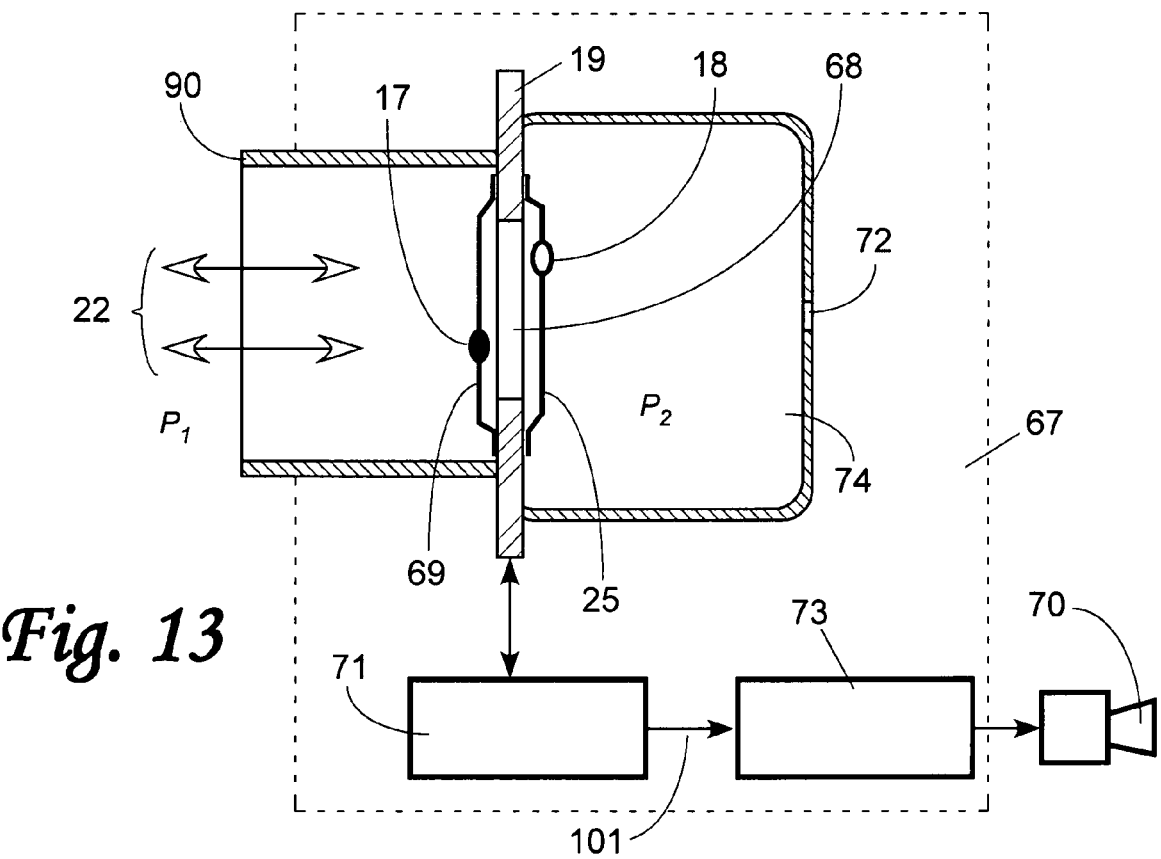
FIG. 13 shows a pressure differential detector for a security system.
Figure 17:
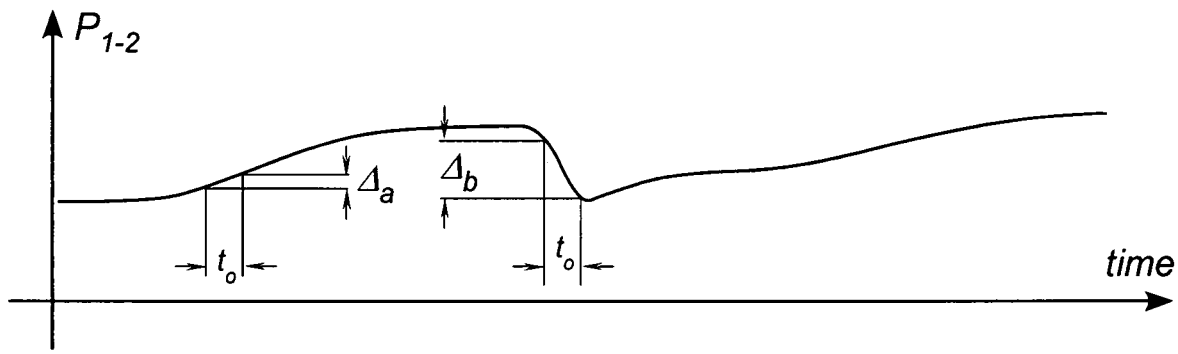
FIG. 17 depicts an air flow rate near the sensor in a security system.

To illustrate how the present invention can be employed in a security system, consider FIG. 13. The purpose of the security device is to respond to relatively rapid changes in the air pressure inside a building. Normally, air pressure in a protected facility changes relatively slowly, along with the external atmospheric pressure. When a door or window is being closed or opened, the air pressure may vary. This can be detected by the device of FIG. 13. The arrangement is similar to one shown in FIG. 7 with the following differences. A short tube 90 (between 0.5 and 5" long) is exposed to the room pressure $P_1$. The reference sensor 18 and TA sensor 17 are positioned at the other end of the tube 90 at the opening 68 of the board 19 and supported by wires 25 and 69. The other side of the board 19 is covered by enclosure 74 which has the internal pressure $P_2$. When pressure $P_1$ changes, air flow 22 goes through the tube 90, the opening 68 to the enclosure 72. At least one hole 72 in the enclosure helps to facilitate the air movement. The servo circuit 71 is connected to the board 19 and generates the output signal 101 that is fed into the processor 73. The variable pressure differential is shown in FIG. 17. The servo circuit output signal has a shape similar the pressure signal of FIG. 17. The processor 73 analyzes rates of the differential pressure changes and identifies if the rate of change is higher than a pre-set threshold value. It is seeing that the rate $\Delta_b$ is greater than $\Delta_a$. When the rate of change is sufficiently high, the alarm 70 is initiated.

Figure 14:
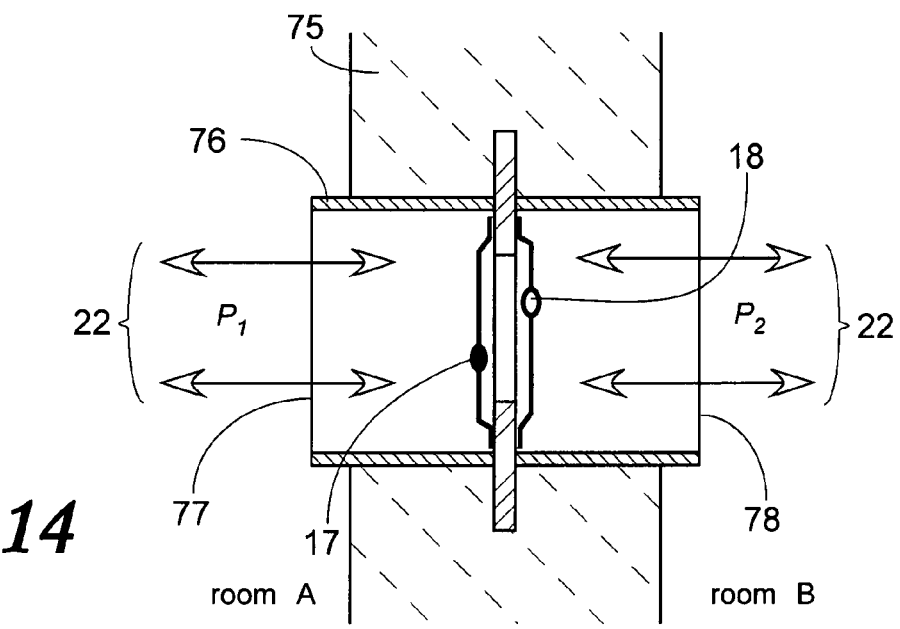
FIG. 14 illustrates a security sensor installed into a wall between two adjacent rooms.

FIG. 14 shows how the similar principle can be employed for two adjacent rooms in a building. The rooms A and B are separated by a wall 75 and have different air pressures $P_1$ and $P_2$, respectively. The sensors 17 and 18 are positioned between two receptive tubes 76 and 78 that respectively face the rooms A and B. The variable air flow 22 is resulted from the variations in pressures in one or both rooms and can be processed in the circuits similar to FIGS. 11 and 15.

Burners and Internal Combustion Engine Applications

Figure 18:
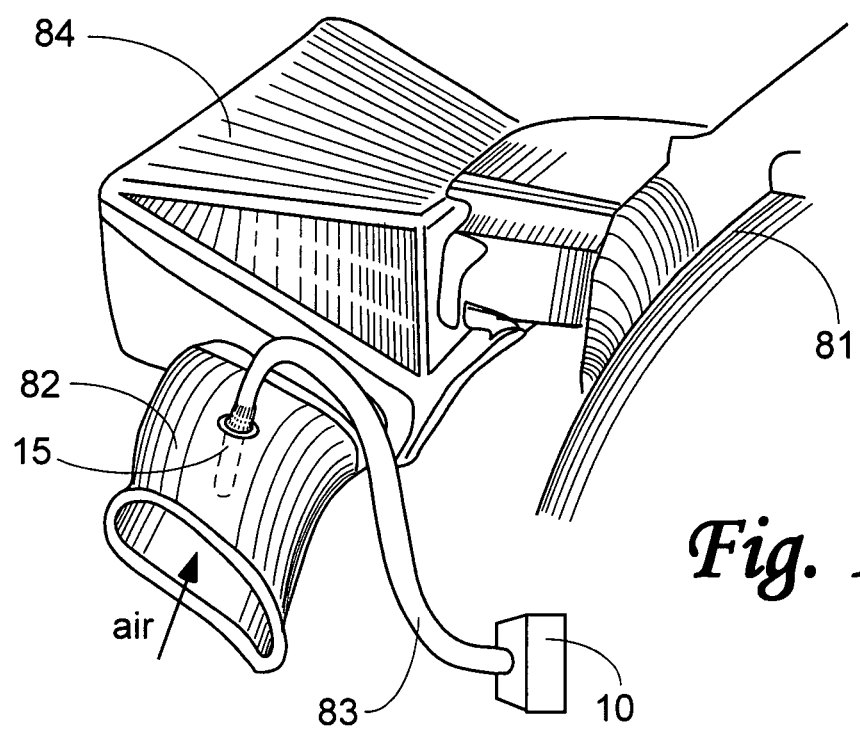
FIG. 18 shows a flow probe arrangement for an internal combustion engine.

A sensor based on the present invention as described above has a natural application for the fuel burners and automotive machinery where the internal combustion engines are in use. FIG. 18 illustrates parts of a gasoline engine with the air filter assembly 84. Air inlet 82 is positioned upstream from the air filter 84 and carries air flow sensing tube 15. The tube 15 is connected through a flexible tubing 83 to the air flow monitor 10. The monitor contain an air flow sensor that is built in accordance to one of the described or implied embodiments of this invention. The monitor 10 is further connected to a signal processor (not shown) that makes use of data received from the air flow monitor 10. One possible use of such monitoring is the detecting of an air filter clogging. The other use is controlling the rate of air intake and control the air-to-fuel mixing ratio to increase the engine or burner efficiency.

The invention claimed is:

1. A pressure sensor for measuring static and dynamic pressures in a flow of gas inside a gas duct having a inner side and outer side, comprising
   a sensing tube having proximal end and a distal end,
   gas flow sensor positioned inside the sensing tube between said proximal end and said distal end, and
   a signal processing circuit attached to said gas flow sensor wherein said proximal end comprises an opening and is positioned proximal to the inner side of said gas duct, and the distal end comprises an opening and is positioned proximal to to the outer side of said gas duct.

2. A pressure sensor of claim 1 where said gas flow sensor is a thermo-anemometer.

3. A pressure sensor of claim 2 where said thermo-anemometer sensor comprises a heater and two thermocouple junctions, wherein the first junction is thermally coupled to the heater and the second junction is thermally insulated from the heater, while both junctions are being exposed to flow of gas.

4. Method of monitoring gas flow in a gas conduit by a gas flow sensor capable of generating a signal and a sensing tube, wherein said sensing tube has a proximal end and a distal end and the gas conduit has a downstream side and outer side, including the steps of
   forming openings in the distal end and proximal end of said sensing tube;
   inserting said proximal end into said gas conduit;
   positioning said distal end of the sensing tube at the outer side of said gas conduit:
   exposing an opening of said proximal end of the sensing tube to said downstream side of the gas conduit;
   positioning a flow sensor inside the sensing tube;
   monitoring the signal generated by said flow sensor, and relating the signal to gas flow in the gas conduit.

5. Method of monitoring gas flow of claim 4 where said gas flow sensor is a thermo-anemometer.

6. A gas flow sensor comprising
   a heater;
   a first temperature sensor being thermally coupled to said heater and capable of generating first signal;
   a second temperature sensor being thermally de-coupled from said heater and capable of generating a second signal;
   a control circuit for providing power to said heater; wherein said control circuit provides electric power in relation to a difference between said first and second signals.

7. A gas flow sensor of claim 6 where said first and second temperature sensors are junctions of a thermocouple.

8. A gas flow sensor of claim 6 further comprising a thermally conductive substrate, wherein said heater is an electrically conductive film being deposited on said substrate, and said first temperature sensor is being thermally coupled to said substrate.

9. A detector of pressure gradients in a room containing gas, comprising
   a board having a front end and back end, wherein said front end is being exposed to the gas in the room;
   an opening formed in said plate between the front end and the back end;
   a gas flow sensor being positioning substantially inside of said opening, and
   a processing electronic circuit.

10. A detector of pressure gradient of claim 9 further comprising an enclosure having an interior and being attached to said back end and separating the back end from the gas in said room.

11. An enclosure of claim 10 further comprising a hole, wherein the hole allows for flow of gas between said interior and said room.

12. An enclosure of claim 11, wherein a cross-sectional area of said hole is substantially smaller than a cross-sectional area of the opening.

13. A thermo-anemometer sensor for measuring flow of fluid comprises a heater and two thermocouple junctions, wherein the first junction is thermally coupled to the heater and the second junction is thermally insulated from the heater, while both junctions are being exposed to flow of fluid.

* * * * *